Patented Jan. 27, 1953

2,626,899

UNITED STATES PATENT OFFICE 2,626,899

GREASE COMPOSITIONS

Stanley T. Abrams and Fred H. Stross, Berkeley, Calif., assignors to Shell Development Company, San Francisco, Calif., a corporation of Delaware No Drawing. Application June 26, 1950, Serial No. 170,480

17 Claims. (Cl. 252—46.4)

This invention is directed to grease compositions. More particularly, it is concerned with greases gelled with certain inorganic colloids and showing improved emulsification properties, corrosion characteristics and other properties.

Greases generally comprise a lubricating oil, generally a mineral oil, containing a gelling agent therefor. Heretofore, the principal gelling agents employed have been soaps such as sodium stearate or lithium-12-hydroxystearate. In an effort to overcome certain inherent disadvantages of soap greases, oleogels having grease structures have been prepared with inorganic gelling agents. These inorganic gelling agents are, for the most part, colloidal oxides, hydroxides and silicates which are of natural origin or which are prepared synthetically. Greases prepared with these inorganic gelling agents exhibit extremely high melting points or appear to have no melting point at all. However, they are sensitive to the presence of water, and unless correctly protected, the greases disintegrate upon the introduction of water or water vapors. While recent developments have provided satisfactory protection against disintegration by water attack, the greases still exhibit two disadvantages which must be overcome. Greases gelled with colloidal silica corrode steel bearings in the presence of water. The addition of ordinary anti-corrosion agents useful in soap greases or in lubricating oil compositions has not overcome this fault.

Greases gelled with inorganic silicates such as certain clays or zeolites do not, for the most part, exhibit dynamic corrosion. By this term is meant the type of corrosion which occurs when the grease is being actively used, such as in a wheel-bearing, with access to water, rather than during storage. However, they tend to emulsify badly with water and show strong evidence of bleeding or disintegration even when waterproofing agents are present.

In the preparation of hydrogels, as a preliminary step in silicate grease manufacture, it has been noted that the hydrogels are difficult to wash with water because the loose gelatinous flocks tend to plug filtercloth surfaces and do not settle rapidly enough to permit washing by decantation.

It is an object of the present invention to improve the process of hydrogel preparation prior to grease formation. It is another object of the present invention to produce greases exhibiting minimum corrosion on steel. It is a further object of this invention to produce greases which do not appreciably soften when mixed with water. It is a principal object of the invention to produce greases of inorganic silicates showing substantial reduction in water-emulsification characteristics. Other objects will become apparent from the following description of the invention.

Now in accordance with the present invention, it has been found that greases gelled with inorganic silicates, said silicates bearing cationic hydrophobic surface-active radicals, may be substantially improved in their emulsification characteristics by salt formation of at least 50% of said hydrophobic radicals with an oxy acid of an element having an atomic number between 14 and 16, consisting of phosphorus-, sulfur- or silicon-containing acids. More particularly, it has been found, in accordance with the present invention, that greases of outstanding water stability are formed by treatment of an inorganic silicate with a high molecular weight amine and subsequent salt formation of the resulting amino radicals with an acid such as phosphoric, sulfuric, silicic acids, mixtures thereof, or their analogs and homologs, either inorganic or organic.

Still in accordance with the present invention, it has been found that greases of outstanding water stability may be prepared by replacing at least 25% of the cationic-exchangeable ions in a clay with hydrogen and, subsequently, treating the clay with a high molecular weight amine and the recited classes of acids to form amine salts.

The cation-exchangeable inorganic colloids useful in the preparation of the greases of the present invention include natural and synthetic complex silicates of which the swelling clays and especially the montmorillonites are particularly preferred. The exact composition of the complex silicates useful as gelling agents in the present compositions is not subject to precise description, since they vary widely from one natural deposit to another. As far as present knowledge permits, they may be described as complex inorganic silicates such as aluminum silicates, magnesium silicates, and barium silicates and the like, containing, in addition to the silicate lattice, varying amounts of cation-exchangeable groups generally regarded as metallic oxide radicals. The table given hereinafter contains naturally-occurring clays, synthetic clays and synthetic zeolites particularly suitable for use in the present compositions. While the Wyoming type of bentonite occurs more generally in deposits throughout the United States, a much more satisfactory clay for the present purpose includes montmorillonite wherein the magnesium content is especially high. Of these, Hectorite exhibits outstanding properties. Hectorite is characterized by the following typical formula:

While the natural clays provide a cheap and large source of inorganic gelling agents, they possess the disadvantages of containing abrasive materials which must be separated therefrom and of varying to a large degree from one natural deposit to another. The abrasive substances, referred to as gangue, may be separated by dispersing the clay in water as described hereinafter and allowing the insoluble particles to settle out.

The use of natural materials may be avoided by the preparation of "synthetic clays" or by the manufacture of synthetic zeolites. Synthetic clays are typically prepared by coprecipitation of silicate and magnesia, drying the coprecipitated gel, mixing the resulting xerogel with an alkali metal hydroxide such as potassium or sodium hydroxide and heating the mixture for a period of one-half to four days at a temperature from 150° to 400° C. under pressures of 200 to 1,000 lbs. per square inch. In a typical small-scale preparation of a synthetic Hectorite, three mols of magnesium chloride were added to three mols of aqueous potassium silicate to produce a coprecipitate of magnesium silicate having a silica-magnesia ratio of about 1.6. The resulting gel was dried and subsequently mixed with 2 N sodium hydroxide solution, using 1.6 liters of sodium hydroxide solution and 200 grams of the xerogel. The resulting mixture, when heated for thirty-six hours at 240° C. under pressure 450–550 lbs. per square inch, produced a complex magnesium silicate giving an X-ray pattern closely similar to that of Hectorite. Similar synthetic clay-like materials may be produced by substituting calcium chloride, barium chloride, aluminum chloride and the like for the magnesium chloride employed above. In place of sodium hydroxide, other hydroxides may be used, such as potassium hydroxide, ammonium hydroxide and lithium hydroxide.

Synthetic zeolites are best described as a series of alumino-silicates containing oxides such as sodium and potassium oxides, in which the sodium and potassium are readily replaced by calcium, magnesium or other ions and vice versa. The framework may be represented by

$$Na_2O \cdot Al_2O_3 \cdot (SiO_2)_{3-13} \cdot (H_2O)_n$$

The cavities in the lattice contain ions such as potassium, sodium, calcium or magnesium, which balance the negative charges in the framework and are readily replaced. The list which follows gives typical natural and synthetic silicates in accordance with the above descriptions.

*Cation-exchangeable inorganic colloids*

A. Natural clays:
　　Bentonites
　　　　Wyoming bentonite
　　　　Montmorillonites
　　　　　　Hectorite
　　Beidellite
　　Saponite
　　Nontronite
　　Sepiolite
　　Biotite
　　Attapulgite
　　Vermiculite
　　Zeolites
　　　　Edingtonite
　　　　Chabazite
　　　　Natrolite
　　　　Mordenites
B. Synthetic clays:
　　Magnesia-silica-sodium oxide
　　Lime-silica-potassium oxide
　　Baria-silica-lithium oxide C. Synthetic zeolites:
　　Complex aluminum silicates
　　　　Exchangeable cation:
　　　　　　Hydrogen
　　　　　　Sodium
　　　　　　Potassium
　　　　　　Barium
　　　　　　Magnesium
　　　　　　Ammonium In order to prepare the inorganic silicates for use as gelling agents for lubricating oils, the silicate is preferably dispersed in water to form a hydrosol. Upon dispersion, the cation-replaceable sites become available for cation exchange, which is generally effected with cationic surface-active water-repelling (or hydrophobic) agents, including quaternary ammonium salts or their hydroxides, high molecular weight salts of amines with inorganic acids, preferably halogen acids, and salts of high molecular weight amines with water-soluble organic acids, the amino or ammonium radicals thereof bearing at least one hydrocarbon radical (preferably alkyl) having 12–30 carbon atoms. Other miscellaneous types of cationic substances may be employed including condensation products of a polymeric nature derived from the condensation of ammonia or low molecular weight primary or secondary amines with acrolein or its analogs.

The treatment of the silicate hydrosol with the cationic materials such as those listed hereinbefore results in the precipitation of a hydrogel hereinafter referred to as an "aminogel." Addition of the cationic materials results in replacement of available cations such as hydrogen, sodium and potassium and the like with substituted ammonium ions exhibiting hydrophobic properties.

A sufficient ratio of amine to silicate must be employed to provide the resulting aminogel with an oleophilic character in order to permit ready dispersion later in the lubricating oils. For the present purpose, it has been found that the clays should bear at least 30% by weight of hydrophobic surface-active radicals and preferably bear between 30 and 75% by weight of said radicals, while optimum results are obtained when using from 40 to 65% of the radicals based upon the weight of the silicates. The mixtures should be stirred or otherwise agitated during introduction of the surface-active agent so as to effect uniform distribution and ion replacement throughout the gel.

In the treatment of natural clays, as well as of the synthetic materials, a preferred category of surface-active agent comprises the quaternary ammonium salts broadly described as tetra-alkyl ammonium halides. At least one, and preferably two, of the alkyl radicals has a chain length of at least twelve carbon atoms, and optimum results are obtained if two of the alkyl radicals have chain lengths between fourteen and eighteen carbon atoms. Representative preferred substances are dimethyl dihexadecylammonium chloride and dimethyl dioctadecylammonium chloride, and mixtures thereof.

While the quaternary ammonium salts described above are preferred, salts of high molecular weight amines, especially primary or secondary amines, may be used. Preferably, these are salts of hydrohalide acids such as hydrochloric acid or water-soluble organic acids such as acetic acid, and the amines contain at least one aliphatic radical having from twelve to twenty-four carbon atoms. Other water-soluble acids may be used to form the salts, such as hydrobromic acid and propionic acid. The cationic materials need not be completely water-soluble for application to the silicate hydrosols. They are, in fact, for the most part, water-dispersible rather than water-soluble. In many cases, they are more soluble in hydrocarbons than in water. This is particularly true when two or more of the alkyl radicals have twelve or more carbon atoms or when the amines are polymeric in nature such as in the case of epichlorohydrin-ammonia condensation products. Epichlorohydrin-ammonia condensation products such as those just referred to have average molecular weights between about 100 and 350 and a general structure as follows:

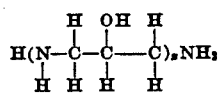

wherein $x$ is an integer sufficient to provide a molecular weight within the recited range. Hydrogen atoms on either the carbon or nitrogen atoms may be replaced with hydrocarbon radicals preferably having from one to six carbon atoms. The following list of cationic surface-active agents gives typical species which may be employed for providing the recited silicates with hydrophobic surfaces:

*Cationic surface-active water-repelling agents*

A. Quaternary ammonium salts:
   Trimethyl dodecylammonium chloride
   Trimethyl tetradecylammonium chloride
   Triethyl hexadecylammonium chloride
   Triethyloctadecylammonium bromide
   Dimethyl dihexadecylammonium chloride
   Dimethyl cetyl lauryl ammonium chloride
   Dimethyl lauryl stearyl ammonium chloride
   Diethyl dioleyl ammonium chloride
   Dimethyl diheptadecylammonium chloride
   Dimethyl octadecyloctadecenylammonium chloride B. Amine salts of inorganic acids:
   Tetradecylamine hydrochloride
   Octadecylamine hydrobromide
   Octadecenylamine hydrochloride
   Methyloctadecylamine hydrochloride
   Ethylhexadecylamine hydrobromide
   Dioctadecylamine hydrochloride
   Octadecylheptadecylamine hydrobromide
   Dihexadecylamine hydrochloride
   Ditetradecylamine hydrobromide
   Octyloctadecylamine hydrochloride C. Ammonium salts of organic acids:
   Octadecylammonium acetate
   Heptadecylammonium propionate
   Hexadecylammonium acetate
   Dioctadecylammonium acetate
   Octadecenylammonium acetate
   Heptadecylammonium acetate
   12-hydroxystearylammonium lactate
   10-ketolaurylammonium acetate D. Miscellaneous amino compounds:
   Acrolein-ammonia condensation products
   Diallylamine-H₂S condensation products
   Epichlorohydrin-ammonia condensation products The class of materials exemplified by the epichlorohydrin-ammonia condensation product is fully described in a copending application of Walter H. Peterson, Serial No. 133,962, filed December 19, 1949. Agents typified by the diallylamine-hydrogen sulfide condensation products are described in U. S. Patent 2,517,564. The class including acrolein-ammonia condensation products is disclosed in U. S. Patent 2,520,720.

In accordance with the present invention, the aminogels prepared by treatment of the described silicates with cationic surface-active agents such as those listed above may be improved especially with respect to their grease-emulsifying characteristics by salt formation with a certain class of acids. The acids found to be particularly effective for this purpose are those in which the acid radical contains an element having an atomic weight between 28.0 and 32.1. Only three elements are included within this group, namely, silicon, sulfur and phosphorus, they have atomic numbers from 14 to 16, inclusive.

The preferred species for preparation of the subject aminogel salts are phosphoric acid and sulfuric acid although the other analogs and homologs thereof including the types listed hereinafter are also effective. The term "acid" in this instance is taken to include partially neutralized acids (such as sodium dihydrogen phosphate or methyl dihydrogen phosphate) as well as the unneutralized acids. These include both organic and inorganic acids and preferably are water-soluble. Alternatively, however, the acids may be oil-soluble, in which case, the aminogels may be treated therewith subsequent to their dispersion in a lubricating oil.

The preferred process comprises treatment of the aminogel while the latter is in aqueous suspension with an amount of the subject acids at least sufficient to form salts with at least 50% of the cationic radicals attached to the silicate. In order to ensure the best results, at least 75% of the cationic radicals should be in salt form, and optimum results are obtained if salt formation is effected with all of the cationic radicals. It has been found a preferable practice in the latter instance to add to the hydrated aminogel a substantial excess of the acid in the general range of 150–350% of the acid required to form a salt with all of the cationic radicals present in the gel.

The following acids illustrate the group contemplated for use in the present compositions. It will be noted that these can be classified as inorganic and organo-inorganic varieties although the inorganic acids are preferred due to their low cost.

*Acids*

A. Inorganic acids:
   1. Phosphorus—
      Phosphorous acid
      Phosphoric acid
      Hypophosphorous acid
      Hypophosphoric acid
      Orthophosphoric acid
      Pyrophosphoric acid
      Triphosphoric acid
      Tetraphosphoric acid
      Metaphosphoric acid
   2. Sulfur—
      Sulfuric acid
      Sulfurous acid
   3. Silica—
      Metasilicic acid
      Orthosilicic acid
      Silicic acids of indeterminate composition
      Polysilicic acids B. Organic acids:
 1. Phosphorus acids—
  Dilauryl hydrogen phosphate
  Dicetyl hydrogen phosphate
  Distearyl hydrogen phosphate
  Lauryl cetyl hydrogen phosphate
  Stearyl dihydrogen phosphate
  Lauryl dihydrogen phosphate
  Dimethyl hydrogen phosphate
  Dibutyl hydrogen phosphate
  Tetradecane-1-phosphinic acid
  10 - phenyldecane - 1 - phosphonic acid
 2. Sulfur acids—
  Stearyl hydrogen sulfonate
  Petroleum hydrogen sulfonate
  Methyl hydrogen sulfonate
  Heptadecyl hydrogen sulfonate
 3. Silicon acids—
  Methyl hydrogen silicate Subsequent to salt formation and any water-washing necessary to remove excess acid or other impurities, the hydrous amino salt gel is added to a lubricating oil for the purpose of grease formation. It has been found that in the preparation of greases from the complex silicates under consideration, the aminogels may be transferred from an aqueous medium to an oleaginous medium without an intermediate drying step. Elimination of this drying step has the double advantage of decreasing manufacturing costs and also avoiding damage to the gel structure required for optimum grease characteristics. If the amino-gels are dried prior to incorporation in a lubricating oil, it appears that the lattice work contracts, and consequently part of the gelling power of the aminoclay is lost. If the hydrous amine salt silicate is added to oil and water removed therefrom subsequently, the greases so prepared contain a minimum amount of the gelling agent to reach a given penetration.

For most purposes, mineral lubricating oils are preferred due to their low cost. These are preferably substantially free from olefins and aromatics and more preferably have a viscosity index of about 60–80 and a viscosity of between about 300 and about 850 SSU at 100° F.

While mineral lubricating oils are suitable for use in more instances, synthetic lubricants may be used in place of or in addition to mineral lubricating oil. The list which follows gives typical species of the varieties which may be employed as the sole lubricant or as mixtures together with several lubricants. Generally, these include oxyalkylene polymers, silicone fluids, organic phosphates, polymerized olefins and esters of dicarboxylic acids.

Lubricating oils:
 Mineral lubricating oil, preferably viscosity of 300–850 SSU at 100° F.
 Propylene oxide polymers
 Ethylene oxide-propylene oxide copolymers
 Trimethylene glycol polymers
 Ethylene glycol-trimethylene glycol copolymers
 Silicone fluids
 Tricresyl phosphate
 Trioctyl phosphate
 Diphenylcresyl phosphate
 Diphenyloctyl phosphate
 Di(3-methylheptyl) adipate
 Octyl caprylate
 Polymerized olefins
 Di(1-methylheptyl) adipate
 Polyvinyl caprylate The compositions prepared according to the above description should contain a major amount of lubricating oil, preferably greater than 80% by weight of the composition and still more preferably between 85 and 95% thereof. The complex silicate should be present in an amount between about 2 and 30% by weight of the composition, preferably between 3 and 10%, while optimum results are obtained when 4–7.5% of the grease is the inorganic gelling agent. The cationic surface-active radicals present on the surface of the gelled silicate should comprise from 30 to 75% by weight of the silicate and preferably between 40 and 65% by weight thereof. In most cases, the best results are obtained if the cationic radicals are present in an amount between about 45–60% by weight of the silicate. The salt-forming acid should be used in an amount stoichiometrically equivalent to at least 50% of the cationic radicals while preferably at least 75% of the radicals are thereby converted to salt form. As noted hereinbefore, the best results are obtained when the cationic radicals are substantially all in the salt form. Summarizing the above constituents, a preferred grease composition comprises the following ingredients:

Mineral lubricating oil__ Major amount.
Colloidal clay_____ 3–10% by weight of the composition.
Cationic radicals_____ 40–65% by weight based on the clay.
Salt-forming acid_____ More than 75% of the available amino radicals.

The general process for the preparation of these greases has been described hereinbefore. To recapitulate, two alternative processes are possible for the preparation of aminogels containing salt-forming improving agents. In the preferred process, the clay or other silicate is dispersed in water to form a hydrosol. Preferably, dispersions of 1 to 5% concentration are easily handled, and the gangue separates readily from dispersions containing 1.5–3.0% of the clay. The cationic surface-active agent is then added to the agitated hydrosol in order to form a hydrous aminogel. Subsequently, the hydrous gel is water-washed to remove salt or other products formed during the cationic replacement operation. The salt-forming acids are then added to the hydrous aminogel, which is preferably in water suspension. Following salt formation (which occurs substantially instantaneously at room temperature), the salt form of the aminogel is washed, if necessary, to remove excess acid, after which the gel is transferred to the lubricating oil. Residual water is then eliminated by treatment of the slurry so formed with heat, reduced pressure or both. Finally, the remaining composition is subjected to a suitable shearing operation for the purpose of creating a grease structure of a homogeneous nature and to increase the consistency of the grease.

In the alternative process, the steps are substantially those outlined above with the exception that salt formation is not effected until after the aminogel has been transferred to the lubricating oil. In this case, an oil-dispersible acid should be employed for the salt formation.

A further refinement of the present compositions has been made possible by the discovery that conversion of exchange cations to the hydrogen form in the complex silicate prior to cationic treatment causes an unexpected improvement in the response to the salt-forming acid. After the complex silicate has been dispersed in water to form a hydrosol, the exchange sites may be converted to the hydrogen form by addition of a suitable acid such as hydrochloric acid. Preferably, from about 25 to about 75% of the exchange sites are converted to the hydrogen form, resulting in a hydrosol having a pH less than about 7 and preferably between 5.5 and 6.5. Subsequent to this adjustment, the cationic water-repelling agent is added, after which the described salt formation may take place. It has been found that especially when the pH of the hydrosol is between about 5.5 and 6.5, the maximum response of the aminogel to the salt-forming acid is obtained. This improved response is demonstrated in Example IV presented hereinafter. The following examples illustrate the improvements obtained by application of the present invention.

*Example I*

Hectorite clay was dispersed in water to form a 2% hydrosol. A settling period of twelve hours, followed by decanting the clear sol, eliminated the gangue. Sixty per cent by weight of the Hectorite of dimethyldiheptadecylammonium chloride was added to the sol with stirring. Sufficient phosphoric acid was added to the suspension to convert all of the amino radicals thereof to the phosphate salt. The salt form of the aminogel settled rapidly and was readily water-washed, after which it was filtered to remove most of the water. The gel was added to a mineral lubricating oil to form a thick slurry or paste, which was heated with stirring to eliminate water. Subsequent to water elimination, the paste was milled with additional oil in a paint mill to improve the grease structure. A similar grease was prepared as described above except that treatment with phosphoric acid was omitted. Both of these greases contained 4% solids and were tested in a water pump.

The pump employed was a 1946 Plymouth passenger-car water pump driven by an electric motor and operating at a speed corresponding to a road speed of 60 miles per hour. Under these conditions, the pump circulated water from a five-gallon tank at a thermostatically controlled temperature of 190° F. The pump contained a 20-gram sample of the grease. It was operated on a cycle of 15-hour periods, followed by 9-hour shutdown periods. Five of such cycles corresponded to operation of 4,500 miles. The data in Table I illustrate the difference obtained between the grease treated with phosphoric acid and that prepared from Hectorite which has not been so treated.

*Example II*

The same procedure described in Example I was followed using a Wyoming bentonite instead of Hectorite. The data in Table I present the comparative observations made with this pair of samples.

*Example III*

A sodium zeolite was prepared by the following process 1845 cc. of sodium silicate solution ($SiO_2:Na_2O$ molar ratio of 3.2:1) was diluted to a sodium content corresponding to 1.4 N-hydroxide. The dilute solution was added to 3.5 liters of 0.79 N sodium aluminate solution. A gel set in about five seconds and was aged for three days. It was then broken up and water-washed with 80 liters of water over a period of eighteen days. The sodium zeolite so prepared was treated with 20% by weight of dimethyldiheptadecylammonium chloride. The resulting aminogel was used for the formation of a grease as described above both with and without treatment with phosphoric acid. The comparative data given in Table I demonstrate the advantage gained by treatment of the zeolite with phosphoric acid.

*Table I*

COMPARATIVE PUMP TESTS

| Example | | Time to First Failure Indication | Observations | Pump Bearing Leakage | | | Hours Operating |
|---|---|---|---|---|---|---|---|
| | | | | Grease | Oil | $H_2O$ | |
| I | Hectorite | 6-10 hours | Heavy emulsification, excessive softening and oil loss.[1] | Heavy | Heavy | None | 70 |
| | Hectorite, $H_3PO_4$ | Did not fail | Grease emulsified | Slight | Slight | do | 73 |
| II | Volclay | 1 | Very heavy oil loss, very heavy emulsification. | Very heavy | Moderate | Slight | 43 |
| | Volclay, $H_3PO_4$ | Did not fail | Grease emulsified but leakage moderate. | Moderate | do | Very slight. | 72 |
| III | Na Zeolite | 2 | Heavy emulsification and oil loss. | do | Very heavy | None | 73 |
| | Na Zeolite, $H_3PO_4$ | | Partial emulsification | do | Slight | do | 85 |

[1] Consistency increased with emulsification.

*Example IV*

A sodium zeolite was prepared as described in Example III except that following the formation of the gel, the pH values of separate portions of the aqueous suspension of the gel were adjusted with HCl after which the gel was water-washed and used in the formation of greases. Part of the sample prepared at each of the pH's given in the table below was treated with phosphoric acid and used in grease preparation. It was found that greases whose aqueous gel had been adjusted to pH 8.6 showed high emulsification value which was reduced to less than half of that value if treated with phosphoric acid. Adjustment of the hydrous gel to a pH between 5.6 and 6.4 resulted in greases having a sharply reduced emulsification tendency. Treatment of these latter two samples with phosphoric acid resulted in a still further reduction in the emulsification of the greases prepared therefrom.

The emulsification test employed was a modification of the "Modified Navy Water Absorption Test Procedure of Project CLLC-13-43." In this test, 20 grams of grease are weighed into a 100 cc. beaker, and 2 cc. of water is added. The water is worked into the grease vigorously for two minutes with a spatula. If the water has been completely absorbed, the procedure is repeated until free water remains. At this point, 4 cc. of water is added and worked into the grease for four minutes. If the observed end point was a true one, at least two-thirds of the last addition will remain as free water, which can be poured off and used in the estimation of the water uptake. The following data demonstrate the benefit obtained by both pH adjustment and treatment with phosphoric acid.

EMULSIFICATION VALUE

| pH | No $H_3PO_4$ | $H_3PO_4$ |
|---|---|---|
| 8.6 | 265 | 110 |
| 6.4 | 60 | --- |
| 5.6 | 70 | 10–20 |

Example V

A Wyoming bentonite was dispersed with water to form a 3% hydrosol. An aminogel thereof was formed by addition of 60% by weight of the bentonite of dimethyldiheptadecylammonium chloride. After water-washing the hydrogel so formed, sulfuric acid was added in an amount sufficient to convert all of the aminogel to the salt form. Greases formed from the resulting gel showed excellent stability toward disintegration in the presence of hot water.

Example VI

The process described in Example V was repeated using sodium silicate as a salt-forming agent. Greases formed from the resulting gel showed satisfactory water emulsion characteristics.

Example VII

Three Hectorite greases were prepared using as the salt-forming agents dilauryl acid phosphate, petroleum sulfonic acids and a condensation product of acrolein and ammonia. The greases formed from the resulting amino salt gels all showed outstanding emulsion characteristics.

The invention claimed is:

1. A grease composition comprising a major amount of a mineral lubricating oil, 2–30% by weight of said composition of colloidally dispersed Hectorite, said Hectorite bearing 30–75% by weight thereof of hydrophobic organo-substituted ammonium ions, said ions having at least one alkyl radical of 12–30 carbon atoms, 50–100% of said ions being in salt form with phosphoric acid.

2. A grease composition comprising a major amount of a mineral lubricating oil, 2–30% by weight of said composition of colloidally dispersed Hectorite, said Hectorite bearing 30–75% by weight thereof of hydrophobic ammonium ions, said ions having at least one alkyl radical of 12–30 carbon atoms, 50–100% of said ions being in salt form with sulfuric acid.

3. A grease composition comprising a major amount of lubricating oil, a minor amount of a montmorillonite colloidally dispersed therein, said montmorillonite bearing at least 30% by weight thereof of hydrophobic cationic surface-active radicals, at least 50% of said radicals being in salt formation with an acid, said acid having an oxy acid group containing an element having an atomic weight between 28.0 and 32.1.

4. A grease composition comprising a major amount of lubricating oil and a minor amount of cation exchange inorganic colloid dispersed therein, said colloid bearing at least 30% by weight thereof of hydrophobic cationic surface-active radicals, at least 50% of said radicals being in salt form with a sulfuric acid.

5. A grease composition comprising a major amount of lubricating oil and a minor amount of cation exchange inorganic colloid dispersed therein, said colloid bearing at least 30% by weight thereof of hydrophobic cationic surface-active radicals, at least 50% of said radicals being in salt form with an inorganic phosphorus oxy acid.

6. A grease composition comprising a major amount of lubricating oil and a minor amount of cation exchange inorganic colloid dispersed therein, said colloid bearing at least 30% by weight thereof of hydrophobic cationic surface-active radicals, at least 50% of said radicals being in salt form with an inorganic sulfur oxy acid.

7. A grease composition comprising a major amount of lubricating oil, a minor amount of a bentonite colloidally dispersed therein, said bentonite bearing at least 30% by weight thereof of hydrophobic cationic surface-active radicals, at least 50% of said radicals being in salt formation with an acid, said acid having an oxy acid group containing an element having an atomic weight between 28.0 and 32.1.

8. A grease composition comprising a major amount of lubricating oil, a minor amount of a zeolite colloidally dispersed therein, said zeolite bearing at least 30% by weight thereof of hydrophobic cationic surface-active radicals, at least 50% of said radicals being in salt formation with an acid, said acid having an oxy acid group containing an element having an atomic weight between 28.0 and 32.1.

9. A grease composition comprising a major amount of lubricating oil, a cation exchange inorganic colloid dispersed therein, said colloid bearing at least 30% by weight thereof of hydrophobic cationic surface-active radicals, at least 50% of said radicals being in salt formation with an acid, said acid having an acid group containing an element having an atomic weight between 28.0 and 32.1.

10. A grease composition comprising a major amount of lubricating oil and a minor amount of cation exchange inorganic colloid dispersed therein, said colloid bearing at least 30% by weight thereof of hydrophobic cationic surface-active radicals, at least 50% of said radicals being in salt form with a phosphorus acid.

11. In a process for the preparation of a lubricating grease, wherein a cation exchange inorganic colloid bearing hydrophobic surface-active radicals is dispersed in a lubricating oil, the steps comprising dispersing said colloid in water, adjusting said colloid and water to a pH below about 7, adding at least 30% by weight based on the colloid of a hydrophobic ammonium compound whereby a reaction product occurs between said colloid and ammonium radicals of said compound, and subsequently adding an acid having an oxy acid group containing an element having an atomic number from 14 to 16, inclusive whereby salt formation occurs between at least 50% of the ammonium radicals attached to said colloid.

12. In a process for the preparation of an improved base exchange reaction product of an inorganic zeolitic colloid containing cation-exchangeable inorganic monovalent cations and a cation-active organic compound having a hydrophobic surface-active onium cation, wherein inorganic monovalent cations of said colloid are exchanged for hydrophobic surface-active organic onium cationic radicals, the step comprising forming a salt between at least 50% of said radicals and an oxy acid of an element having an atomic number from 14 to 16, inclusive, said step being subsequent to the base exchange reaction.

13. In a process for the preparation of a lubricating grease, wherein a lubricating oil is thickened to a grease consistency with a base exchange reaction product of an inorganic zeolitic colloid containing cation-exchangeable monovalent cations and a cation-active organic compound having a hydrophobic surface-active cation, said product being formed by exchange of monovalent cations of said colloid for hydrophobic surface-active cationic organic radicals of said cation-active compound, the step comprising forming a salt between at least 50% of said radicals and an oxy acid of an element having an atomic number from 14 to 16, inclusive, said step being subsequent to the base exchange reaction.

14. A grease composition comprising a major amount of mineral lubricating oil, a minor amount of a bentonite colloidally dispersed therein, said bentonite bearing between 30% and 75% by weight thereof of a hydrophobic tetraalkyl ammonium ion, said ion having at least 1 alkyl radical containing between 12 and 30 carbon atoms, and between 50% and 100% of said ions being in salt formation with an acid, said acid having an oxy acid group containing an element having an atomic number from 14 to 16 inclusive.

15. A grease composition comprising a major amount of mineral lubricating oil, a minor amount of a montmorillonite colloidally dispersed therein, said montmorillonite bearing at least 30% by weight thereof of hydrophobic cationic surface-active radicals, at least 50% of said radicals being in salt formation with an acid, said acid having an oxy acid group containing an element having an atomic weight between 28.0 and 32.1.

16. A grease composition comprising a major amount of a mineral lubricating oil and a minor amount of a cation exchange inorganic colloid dispersed therein, said colloid bearing at least 30% by weight thereof of hydrophobic organo-substituted ammonium ions, said ions having at least one alkyl radical of 12–30 carbon atoms, at least 50% of the ions being in salt form with an inorganic phosphorous oxy acid.

17. A grease composition comprising a major amount of a mineral lubricating oil and a minor amount of a montmorillonite colloidally dispersed therein, said montmorillonite bearing at least 30% by weight of hydrophobic organo-substituted ammonium ions, said ions having at least one alkyl radical of 12–30 carbon atoms, at least 50% of said ions being in salt form with an inorganic phosphorous acid.

STANLEY T. ABRAMS.
FRED H. STROSS.

REFERENCES CITED

The following references are of record in the file of this patent:

UNITED STATES PATENTS

| Number | Name | Date |
| --- | --- | --- |
| 2,531,440 | Jordan | Nov. 28, 1950 |